Nov. 7, 1967

R. ASHTON ET AL 3,350,865

GATHERING UNIT FOR CORN HARVESTERS

Filed Nov. 5, 1964

INVENTORS.
ROBERT ASHTON
JAMES G. BUTLER &
M. LEROY GULLICKSON
BY
Tweedale & Gerhardt
ATTORNEYS.

Nov. 7, 1967  R. ASHTON ET AL  3,350,865
GATHERING UNIT FOR CORN HARVESTERS
Filed Nov. 5, 1964  2 Sheets-Sheet 2
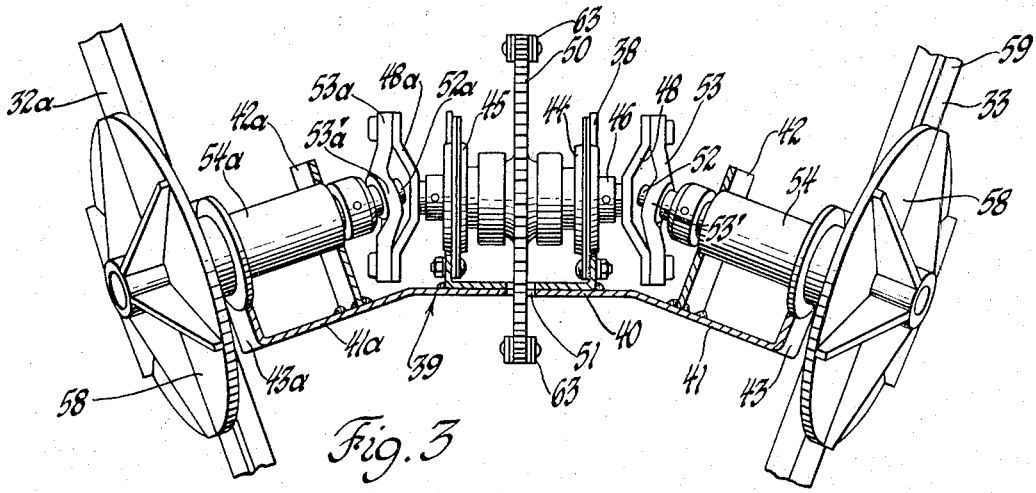
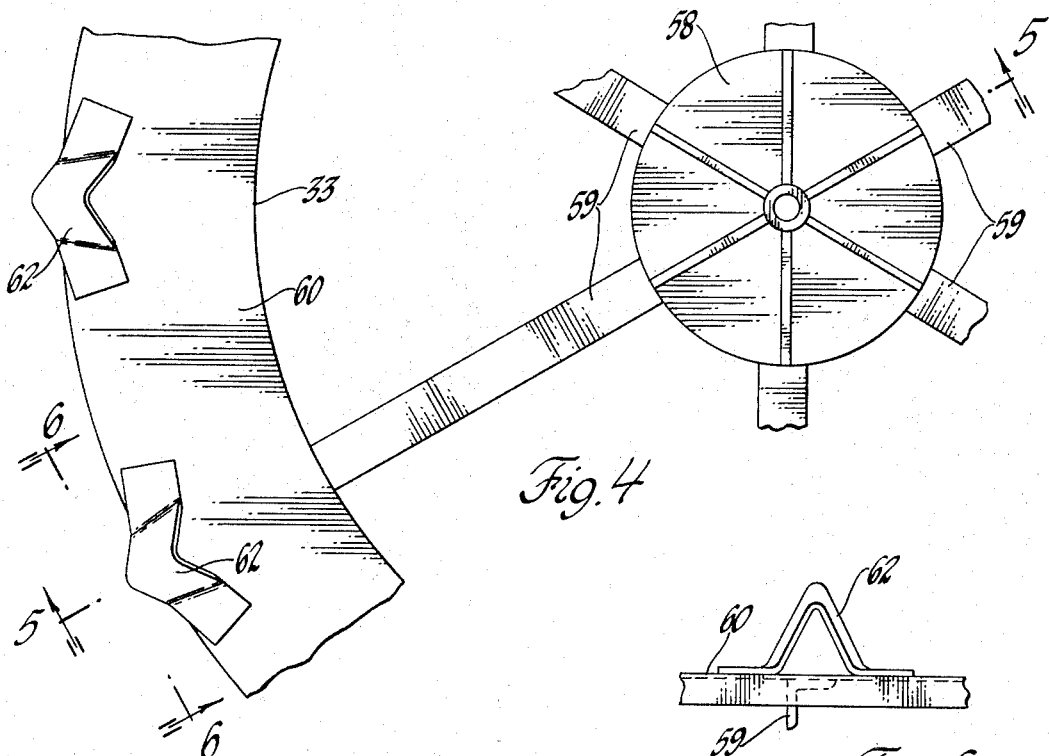
INVENTORS.
ROBERT ASHTON
JAMES G. BUTLER &
M. LEROY GULLICKSON
BY Tweedale & Eberhardt
ATTORNEYS.

3,350,865
GATHERING UNIT FOR CORN HARVESTERS
Robert Ashton and James G. Butler, Islington, Ontario, and Myron Leroy Gullickson, Albion Township, Ontario, Canada, assignors to Massey-Ferguson Limited, Toronto, Ontario, Canada
Filed Nov. 5, 1964, Ser. No. 409,134
6 Claims. (Cl. 56—119)

This invention relates to corn harvesters and more particularly to gathering units for feeding standing corn stalks into the stripping and snapping rolls of a corn picking unit.

In conventional corn or maize harvesting machines, the standing corn stalks are generally fed into the snapping and stripping units of the machine where the ears are moved from the stalks by means of gathering chains having inwardly projecting fingers which rotate in planes parallel to an position above the stripping plates and snapping rolls. As the picking unit advances along the rolls of corn, the fingers on the gathering chains pull the standing stalks into the stripping slot and the snapping rolls pull the stalks downwardly through the stripping slot which separates the ears from the stalks, and the fingers on the gathering chains feed the separated ears rearwardly into the crop feeding mechanism of a combine or the like.

The gathering unit of the present invention comprises a pair of opposed wheels which are mounted forwardly of the picking unit in such a manner that, as the harvester moves along the rows of corn, the stalks pass between the gathering wheels. The gathering wheels rotate in upwardly and rearwardly converging planes to direct the stalks into the picking unit. Projecting inwardly from the opposed faces of the wheels near their peripheries is a plurality of fingers which engage the stalks and feed them rearwardly as the harvester advances. The wheels are driven at speeds such that the stalks are fed rearwardly at a faster rate than the ground speed of the harvester, and the direction of rotation is such that the fingers on the lower periphery of the wheels move rearwardly to engage the stalks and force them into the harvesting unit.

The objects, advantages and features of the invention will become apparent from the following description taken in connection with the accompanying drawings in which:

FIG. 3 is a sectional view taken on lines 3—3 of FIG. 1;

FIG. 4 is an elevational view of one of the gathering wheels embodying the invention; and FIGS. 5 and 6 are detailed views taken on lines 5—5 and 6—6, respectively, of FIG. 4.

While the invention will be described in connection with a preferred embodiment, it should be understood that the invention is not limited to the specific embodiment illustrated. On the contrary, all alternatives, modifications and equivalents, which may be included within the spirit and scope of the invention are intended to be covered herein.

Figure 1:
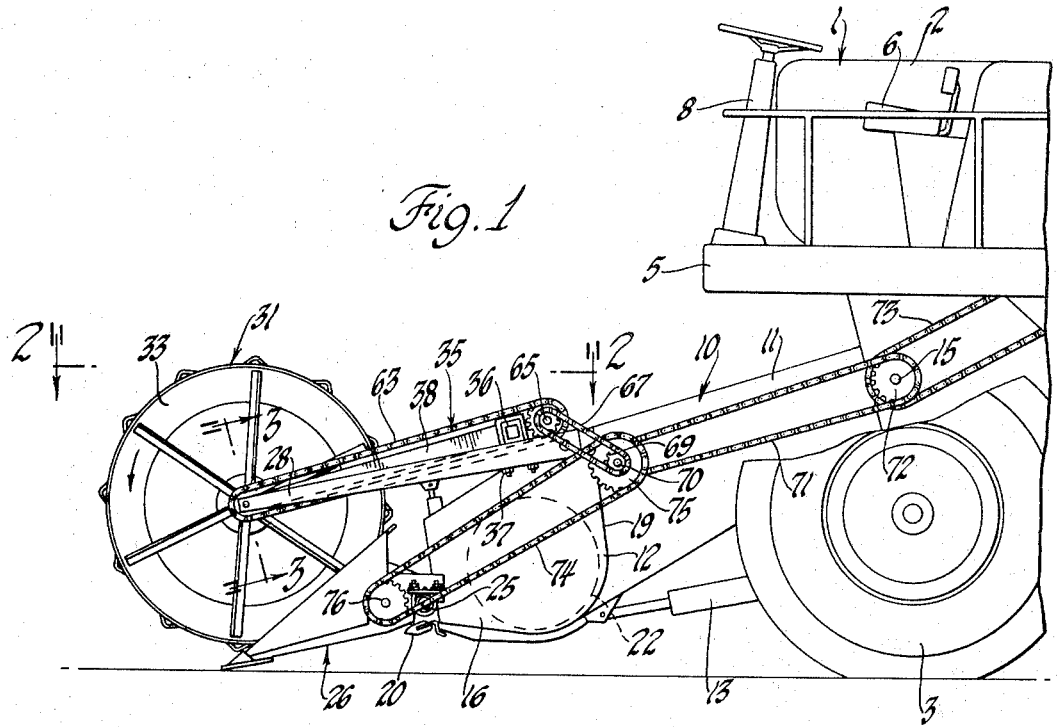
FIG. 1 is an elevational view of a combine having a corn harvesting attachment embodying the invention mounted thereon.

In FIG. 1, reference numeral 1 designates generally the forward portion of a combine having a main body 2 supported on front wheels 3 (only one of which is visible in the drawing). Mounted on the main body 2 is an operator's platform 5 on which is supported a seat 6 and steering column 8. Supported for vertical, pivotal movement on the forward end of main body 2 is a header assembly 10.

Header 10 includes a conventional elevator 11 having an undershot endless conveyor (not shown) for carrying crop material from a transverse grain table or platform 12 into the threshing and other crop treating mechanism within the main body 2. Header 10 is vertically movable about the axis of a shaft 15 by means of a piston and cylinder assembly 13.

Harvesting table 12 is generally in a shape of a scoop having end walls 16 joined together by a deck or bottom wall 18 and a rear wall 19. Mounted on the leading edge of deck 18 is a cutter bar 20 for cutting standing grain crops such as wheat, barley and alfalfa, as the combine advances through the crop. When harvesting grain crops, as opposed to corn or other row crops, a grain reel (not shown) is supported on the table and directs the grain into the cutter bar. The cut grain falls onto deck 18 where it is carried to the inlet of elevator 11 by a conveyor 22 which is commonly of the auger type rotatably supported between end walls 16 of the table. Auger 22 is provided with oppositely disposed helical flights 22 which direct the grain or cut crop material to the central portion of the table where it is fed into elevator 11 by means of pickup fingers 24 projecting from the auger between the opposed screw flights 23.

To convert combine 1 for harvesting corn and other row crops instead of grain crops, the grain reel is removed from the forward ends of support arms 28 which are supported on table 12, and a support bar 25 is secured to table 12 near the lower front edges of end walls 16 by any suitable means (not shown).

Mounted on support bar 25 is a plurality of identical corn picking units 26, 26a and 26b, each including mechanism for removing the ears of corn from standing stalks and depositing them rearwardly onto deck 18 of table 12 where they are conveyed by auger 22 to the inlet of elevator 11.

Picking units 26 each include a guide slot 29 and a stripping slot 30 formed by a pair of spaced, transversely disposed stripper plates. As standing corn stalks are fed into guide slot 29, they are picked up by a stalk feeding and snapping roll disposed beneath and parallel to stripping slot 30. The stalk feeding and snapping unit forces the stalks into stripping slot 30 and pulls them downwardly through the slot to remove the ears therefrom, the slot being too small for the ears to pass through.

In the illustrated embodiment, picking units 26 include transverse stripper plates and snapping units of the type disclosed in our co-pending application, S.N. 409,135, entitled, "Corn Harvester," filed on even date herewith, the entire disclosure of which is incorporated herein by reference. However, the picking units 26 are not limited to the specific type disclosed in the aforesaid co-pending application but may be of the conventional type.

For feeding the stalks into the guide slot of the picking units, the gathering means of the present invention includes a pair of gathering wheels 32 and 33 rotatable in upwardly and rearwardly converging planes. The gathering wheels of gathering unit 31 are supported on a support frame 35 including a transverse tubular bar 36 which is secured to support arms 28 by U-bolts 37 as shown in FIG. 1. Projecting forwardly from transverse support bar 35 is a plurality of wheel support arms 38 which are spaced from each other a row width apart. Each support arm 38 supports one wheel 32 and 33 of adjacent picking units 26. For example, the wheel support arm 38a supports gathering wheel 33 for picking unit 26 and gathering wheel 32a for picking unit 26a.

Figure 2:
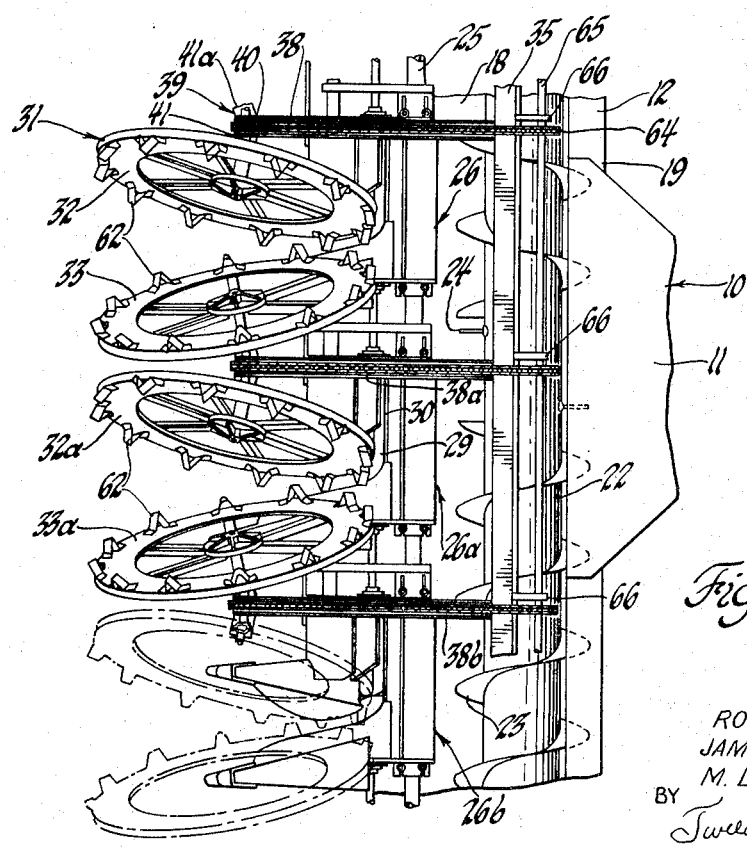
FIG. 2 is a partial plan view of the table and corn harvesting attachments of the combine of FIG. 1.

As shown in FIG. 3, a support bracket 39 is welded to the outer ends of support members 38 and includes a central portion 40 which is inclined downwardly and forwardly as viewed in FIG. 1 having skewed portions 41 and 41a extending from the ends of central portion 40 which are inclined downwardly and outwardly. Projecting perpendicularly from skewed portions 41 and 41a are pairs of plate members 42, 43 and 42a, 43a, respectively. As shown in FIG. 2, the skewed portions 41 and 41a also project at an angle forwardly and outwardly from the central portion 40 to cause wheels 32 and 33 to lie in rearwardly and upwardly converging planes.

Support member 38 is channel shaped in cross-section as shown in FIG. 3, and a drive shaft 46 is journalled in bearing members 44 and 45 which are secured to the upstanding side walls of member 38. Non-rotatably mounted on the outer ends of drive shaft 46 are output coupling plates 48 and 48a. Non-rotatably mounted on drive shaft 46 between the upstanding side walls of support member 38 is a sprocket 50 which projects through a slot 51 extending through the lower wall of member 38 and the central portion 40 of bracket 39.

A sleeve bearing 54 is mounted in plates 42 and 43, and the shaft 52 of gathering wheel 33 is rotatably journalled in bearing 54. Secured to the end of shaft 52 is an input coupling plate 53, which in turn is drivingly connected with output coupling plate 48. Coupling plate 53 is formed with a skewed central portion 53' lying in a plane transverse to the axis of shaft 52, and shaft 52 is secured to portion 53'. Thus, rotation of sprocket 50 is transmitted to gathering wheel 33 through drive shaft 46, output coupling plate 48, input coupling plate 53 and shaft 52. The shaft 52a of gathering wheel 32a is similarly journalled in the bearing 54a in plates 43a and 42a, and is similarly coupled to shaft 46 by means of coupling plates 48a and 53a on the ends of shafts 46 and 52a, respectively.

As shown in FIG. 4, each gathering wheel 33 includes a hub 58, radial spokes 59 and a circular rim 60 at the outer ends of spokes 59. Projecting from the opposed inner faces of rims 60 of each pair of gathering wheels is a plurality of peripheral fingers 62, which as shown in FIG. 2, rotate about the axes of shaft 54 in rearwardly and upwardly converging planes to guide the corn stalks into guide slot 29 of the picking units.

Sprocket 50 is driven by a chain 63 which extends around a sprocket 64 non-rotatably secured to a shaft 65 journalled in rearwardly projecting plates 66 on the transverse support arm 36. Shaft 65 is driven by a chain 67 through a sprocket mounted on the ends of shaft 65, chains 67 in turn extending around sprocket 69 on the end of a shaft 70 supported on header 10. Shaft 70 is driven by a chain 71 extending around a sprocket 72 on shaft 15, and shaft 15 is driven from the combine power plant by a chain 73. The snapping and conveying rolls of picking units 26 are driven by a chain 74 extending around a sprocket 75 on shaft 70 as well as a sprocket 76 carried by picking units 26.

In operation, as the combine advances axially along a row of corn, each pair of gathering wheels 32 and 33 straddle the row of corn and the picking fingers 62 engage the standing stalks as the fingers pass through the lower, rear quadrant (as viewed in FIG. 1) of their path of rotation and force them rearwardly into guide slot 29 where they are fed into stripping slot 30 by the mechanism of picking units 26. The speed at which the gathering wheels are driven in such that the fingers 62 travel rearwardly at a faster speed than the forward speed of the combine to positively force the standing stalks into the picking units.

With the elimination of the conventional chain type gathering units, the possibility of jamming the gathering units is substantially eliminated by the wheel type gathering units of the present invention. Moreover, by having a separate drive for the gathering units independently of the picking units, the driving arrangement is simplified.

It is apparent to those skilled in the art that while a specific embodiment of the invention has been disclosed, various alterations and modifications in the construction or arrangement of parts is possible without departing from the scope and spirit of the invention.

What is claimed is:

1. A corn harvester including means defining a stripping slot, snapping means for pulling standing corn stalks through said stripping slot for removing the ears therefrom, and gathering means projecting forwardly of said stripping slot and snapping means for directing standing corn stalks into the stripping slot as the harvester advances axially along a row of standing corn characterized by said gathering means comprising a pair of opposed wheels and a plurality of inwardly projecting fingers near the periphery of each of said wheels, the fingers on the opposed wheels moving in circular paths about axes of their respective wheels, said wheels being simultaneously rotatable in a direction to cause the fingers to move toward the stripping slot in the lower portion of their respective paths, and to move away from the stripping slot in the upper portions of their respective paths, said wheels being disposed in converging planes to cause the fingers on the opposed wheels to converge toward each other as they move toward the stripping slot and engage the corn stalks and feed them into the stripping slot.

2. A corn harvester as defined in claim 1 further including drive means for rotating the wheels such that the tangential speed of the inwardly projecting fingers is greater than the speed of the harvester whereby the stalks are forced rearwardly into the stripping slot.

3. A combine harvester including: a main body; an elevator supported on the forward end of said main body for vertical pivotal movement; a transverse harvesting table carried by the elevator; a conveyor mounted on said table for conveying harvested crop material from the table to the elevator, a plurality of corn picking units supported on the leading edge of said harvesting table each including means defining a stripping slot and snapping means disposed beneath said stripping slot for engaging standing corn stalks in the stripping slot and pulling the corn stalks through the stripping slot to remove the ears therefrom; and gathering means for each of said picking units supported on said harvesting table and projecting forwardly of the picking units for feeding standing corn stalks into the picking units as the harvester advances along rows of standing corn; characterized by said gathering means including a pair of opposed wheels for each of said picking units, each wheel of said pair being disposed on opposite sides of the corn rows, and inwardly projecting fingers on the opposed faces of said wheels near the periphery thereof operable upon rotation of the wheels to engage the standing stalks and feed them rearwardly into said picking units; said wheels being disposed in converging planes to cause the fingers on the opposed wheels to converge toward each other as they are carried by rotation of the wheels toward the stripping slot and engage the corn stalks to feed them into the stripping slot.

4. In a corn or other row crop harvester, a gathering unit including a support bracket having a central portion and a skewed portion extending angularly from each edge of said central portion, a drive shaft mounted on the central portion in parallel relationship therewith, a gathering wheel having a shaft mounted on each of said skewed portions in parallel relationship therewith, means coupling said drive shaft and wheel shafts together for rotating said gathering wheels about the axes of their respective wheel shafts through said drive shaft, said coupling means comprising an input plate drivingly connected with said drive shaft, an output coupling plate having a skewed, central portion lying in a plane transverse to the axis of said wheel shaft and drivingly connected to said wheel shaft, said coupling plates being connected together to transmit rotation from said drive shaft to said wheel shaft, and means coacting with the gathering wheel whereby to engage the corn.

5. The construction defined in claim 4 in which said skewed portions project forwardly and downwardly from the central portion.

6. The construction of claim 5 further including a plurality of inwardly projecting fingers on each gathering wheel near the periphery thereof, said fingers projecting from the side of said wheel opposite said drive shaft in a generally axial direction with respect to said wheel.

References Cited

UNITED STATES PATENTS

| | | | |
|---|---|---|---|
| 1,964,579 | 6/1934 | Hyman | 56—119 |
| 2,648,942 | 8/1953 | Grant et al. | 56—16 |
| 2,888,081 | 5/1959 | Hammer et al. | 171—58 |
| 3,070,939 | 1/1963 | Schwartz | 56—2 |

ABRAHAM G. STONE, *Primary Examiner.*

ANTONIO F. GUIDA, *Examiner.*

P. A. RAZZANO, *Assistant Examiner.*